(12) United States Patent
Xu et al.

(10) Patent No.: US 10,761,990 B2
(45) Date of Patent: Sep. 1, 2020

(54) METHODS AND DEVICES FOR MANAGING CACHE

(71) Applicant: EMC IP Holding Company LLC, Hopkinton, MA (US)

(72) Inventors: Xinlei Xu, Beijing (CN); Jian Gao, Beijing (CN); Ruiyong Jia, Beijing (CN); Liam Xiongcheng Li, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/021,614

(22) Filed: Jun. 28, 2018

(65) Prior Publication Data

US 2019/0004959 A1 Jan. 3, 2019

(30) Foreign Application Priority Data

Jun. 30, 2017 (CN) .......................... 2017 1 0526543

(51) Int. Cl.
*G06F 12/0871* (2016.01)
*G06F 12/0891* (2016.01)
*G06F 12/0815* (2016.01)

(52) U.S. Cl.
CPC ...... *G06F 12/0871* (2013.01); *G06F 12/0815* (2013.01); *G06F 12/0891* (2013.01); *G06F 2212/262* (2013.01)

(58) Field of Classification Search
CPC ............. G06F 12/0815; G06F 12/0871; G06F 12/0891; G06F 12/0897; G06F 2212/262
See application file for complete search history.

(56) References Cited

U.S. PATENT DOCUMENTS

| | | | | |
|---|---|---|---|---|
| 6,088,789 A | * | 7/2000 | Witt | .................... G06F 12/0862 711/113 |
| 6,745,324 B1 | * | 6/2004 | Skazinski | ................. G06F 8/60 713/2 |
| 8,924,647 B1 | | 12/2014 | Evans | |
| 8,943,273 B1 | * | 1/2015 | Jamil | .................. G06F 12/0804 711/126 |
| 9,047,225 B1 | | 6/2015 | Evans | |
| 9,645,932 B1 | | 5/2017 | Bono et al. | |
| 9,727,479 B1 | | 8/2017 | Armangau et al. | |
| 9,864,683 B1 | | 1/2018 | Xu et al. | |

(Continued)

OTHER PUBLICATIONS

Xiongcheng Li, et al.; "Method, Apparatus and Computer Program Product for Managing Cache," U.S. Appl. No. 16/445,990, filed Jun. 19, 2019.

*Primary Examiner* — Aracelis Ruiz
(74) *Attorney, Agent, or Firm* — BainwoodHuang

(57) ABSTRACT

Embodiments of the present disclosure relate to methods and devices for managing cache. The method comprises in response to receiving a read request, determining whether data associated with the read request is present in a first cache, the first cache being a read-only cache. The method also comprises in response to a miss of the data in the first cache, determining whether the data is present in a second cache, the second cache being a readable and writable cache. The method further comprises: in response to hitting the data in the second cache, returning the data as a response to the read request; and reading the data into the first cache.

11 Claims, 6 Drawing Sheets

(56) References Cited

U.S. PATENT DOCUMENTS

2003/0225967 A1* 12/2003 Kohli ............... G06F 3/0601
711/112
2016/0026406 A1* 1/2016 Hahn ............... G06F 12/0802
711/103

* cited by examiner

METHODS AND DEVICES FOR MANAGING CACHE

RELATED APPLICATIONS

This application claim priority from Chinese Patent Application Number CN 201710526543.0, filed on Jun. 30, 2017 at the State Intellectual Property Office, China, titled "METHOD AND DEVICE FOR CACHE MANAGEMENT" the contents of which is herein incorporated by reference in its entirety.

FIELD

Embodiments of the present disclosure relate to the memory field, and more specifically, to methods and devices for managing cache

BACKGROUND

With development of computer technology, cache is arranged between processors and mass storage devices to improve processing speed of the processor and reduce difference in access speed between processors and mass storage devices. As the data processing capability of cache is similar to that of the processor, the cache can rapidly receive the data transmitted by the processor and quickly transmit the cached data to the processor.

After configuring the cache, when the data to be read is hit in the cache, the data is directly read from the cache and returned to an upper-layer application. If the data to be read is not hit in the cache, the data is read from a lower-layer mass storage device. At this time, the length of time for reading data will be longer. In the write procedure, when the data to be written is hit in the cache, it is directly written into the cache; if not hit, storage space of the cache will be allocated to write data. The written data is stored in the lower-layer mass storage device during the subsequent flush procedure. Thus, the frequently used data will be stored in the cache to improve data processing capability.

SUMMARY

Embodiments of the present disclosure provide method and device for managing a cache.

According to a first aspect of the present disclosure, there is provided a method of managing a cache. The method comprises in response to receiving a read request, determining whether data associated with the read request is present in a first cache, the first cache being a read-only cache. The method also comprises in response to a miss the data in the first cache, determining whether the data is present in a second cache, the second cache being a readable and writable cache. The method further comprises: in response to hitting the data in the second cache, returning the data as a response to the read request; and reading the data into the first cache.

In some embodiments, the method further comprises: in response to a miss of the data in the second cache, reading the data from a lower-layer storage device associated with the cache as a response to the read request; and storing the data into the first cache.

In some embodiments, the method further comprises: dynamically adjusting a size of the first cache based usage of a memory space.

In some embodiments, wherein the first cache is selected from a memory space for a file system.

According to a second aspect of the present disclosure, there is provided a method of managing a cache. The method comprises in response to receiving a write request, determining whether data associated with the write request is present in a first cache, the first cache being a read-only cache; and in response to hitting the data in the first cache, writing the data into a second cache, the second cache being a readable and writable cache; and writing the data into the first cache.

According to a third aspect of the present disclosure, there is provided a cache manager. The manager comprises: a processor; and a memory having computer program instructions stored thereon, the processor executing the computer program instructions in the memory to control the cache manager to perform acts comprising: in response to receiving a read request, determining whether data associated with the read request is present in a first cache, the first cache being a read-only cache; in response to a miss of the data in the first cache, determining whether the data is present in a second cache, the second cache being a readable and writable cache; and in response to hitting the data in the second cache, returning the data as a response to the read request; and reading the data into the first cache.

According to a fourth aspect of the present disclosure, there is provided a cache manager. The manager comprises: a processor; and a memory having computer program instructions stored thereon, the processor executing the computer program instructions in the memory to control the cache manager to perform acts comprising: in response to receiving a write request, determining whether data associated with the write request is present in a first cache, the first cache being a read-only cache; and in response to hitting the data in the first cache, writing the data into a second cache, the second cache being a readable and writable cache; and writing the data into the first cache.

According to a fifth aspect of the present disclosure, there is provided a computer program product being tangibly stored on a non-volatile computer readable medium and comprising machine executable instructions which, when executed, cause a machine to perform steps of the method in the first aspect and the second aspect of the present disclosure.

BRIEF DESCRIPTION OF THE DRAWINGS

Through the more detailed description of example embodiments of the present disclosure with reference to the accompanying drawings, the above and other objectives, features, and advantages of the present disclosure will become more apparent, wherein same reference signs usually refer to the same components in the example embodiments of the present disclosure.

Figure 1A:
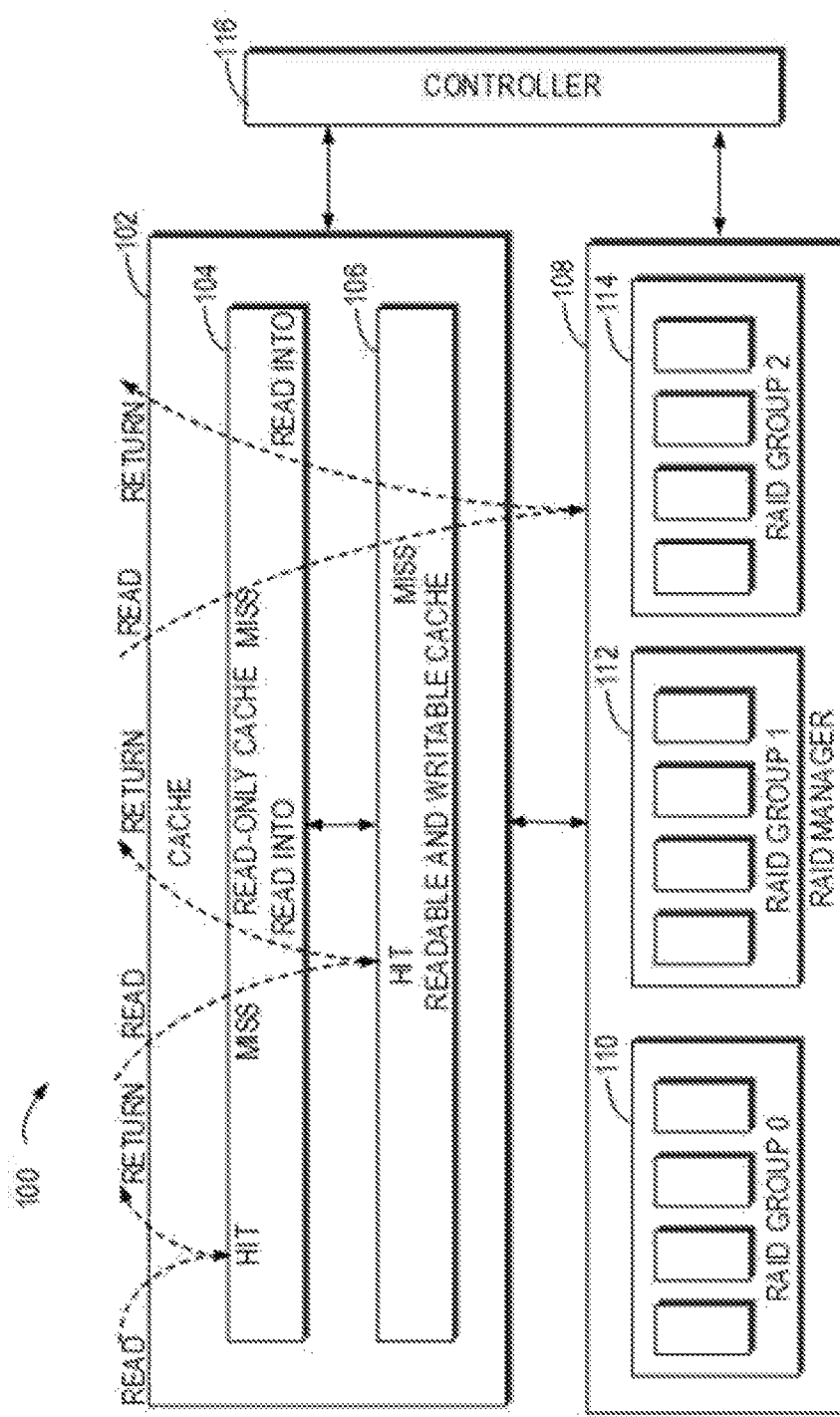
FIG. 1A and FIG. 1B illustrate architecture diagrams of a storage device 100 according to embodiments of the present disclosure.

In each drawing, same or corresponding signs indicate the same or corresponding components.

DETAILED DESCRIPTION OF EMBODIMENTS

The embodiments of the present disclosure will be described in more details with reference to the drawings. Although the drawings illustrate some embodiments of the present disclosure, it should be appreciated that the present disclosure can be implemented in various manners and should not be limited to the embodiments described herein. On the contrary, the embodiments are provided to understand the present disclosure in a more thorough and complete way. It should be appreciated that drawings and embodiments of the present disclosure are only for exemplary purposes rather than restricting the protection scope of the present disclosure.

In the descriptions of the embodiments of the present disclosure, the term "includes" and its variants are to be considered as open-ended terms that mean "includes, but is not limited to." The term "based on" is to be understood as "based at least in part on." The terms "one embodiment" and "this embodiment" are to be read as "at least one embodiment." The terms "first", "second" and so on can refer to same or different objects. The following text also can comprise other explicit and implicit definitions.

The principle of the present disclosure will be described with reference to the several example embodiments shown in the drawings. Although the drawings illustrate preferred embodiments of the present disclosure, it should be understood that the embodiments described herein merely enable those skilled in the art to better understand and further implement the present disclosure and is not intended for limiting the scope of the present disclosure in any manner.

As the costs for cache are quite high, the cache capacity for the computing device is normally limited, which restricts improving the data processing capability of the processor. In another aspect, it usually pre-allocates a predetermined size of memory space for some potential services in the computing device. If these potential services are not utilized, the memory space reserved for such services is free, which results into waste of memory resources. Regarding this, embodiments of the present disclosure provide a solution for managing a cache. In this solution, it improves data processing efficiency of the cache by using the reserved memory space as cache.

Figure 1B:
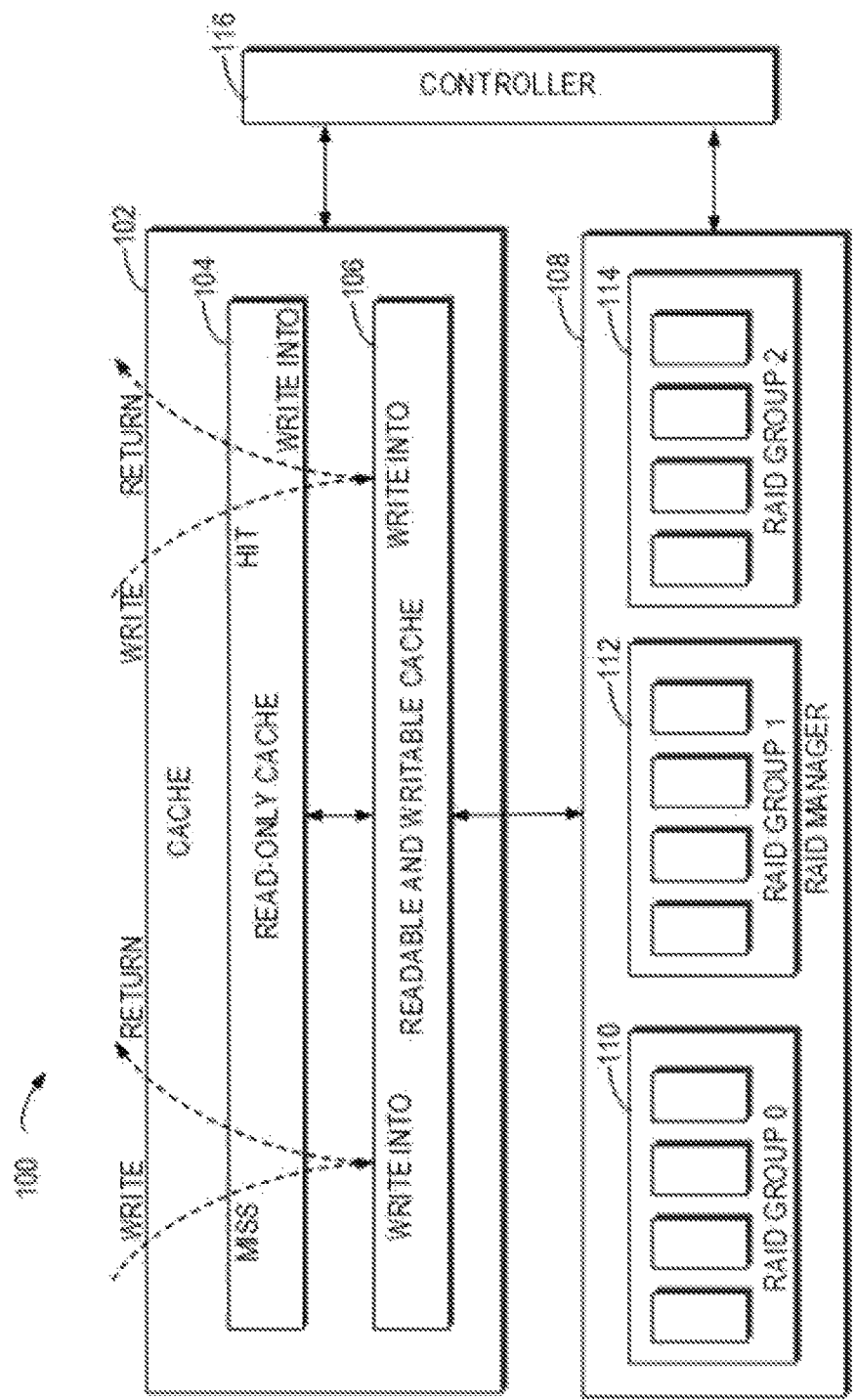

FIG. 1A and FIG. 1B schematically illustrate architecture diagram of a storage system 100 according to embodiments of the present disclosure, wherein FIG. 1A relates to process of read operations on the storage system 100 and FIG. 1B relates to process of write operations on the storage system 100.

In general, the storage system 100 includes a cache 102, a controller 116 and a RAID manager 108. The RAID manager 108 is a mass storage device that can store a large amount of data, and includes a plurality of RAID groups. In this embodiment, it includes three RAID groups 110, 112 and 114. The number of the above RAID groups is only exemplary and is not intended to restrict the number of the RAID groups. In an alternative embodiment, the RAID manager 108 includes other quantities of RAID groups. A disk array within the RAID group can be disk array of different levels, including but not limited to, RAID0, RAID1, RAID0+1, RAID2, RAID3, RAID4, RAID5, RAID7, RAID10 and RAID53. In an alternative embodiment, the RAID manager 108 also can be other types of mass storage devices, including various volatile and/or non-volatile data storage media. Examples of storage media can include but not limited to disk array, disk, optical disk, hard disk and solid-state disk (SSD).

The controller 116 controls various kinds of operations for the cache 102 and the RAID manager 108. The cache 102 can store the data that needs to be read or written. The cache 102 includes a read-only cache 104 and a readable and writable cache 106. The readable and writable cache 106 is a universal cache in the computing device and is a readable and writable cache with respect to the upper-layer applications. It is also referred to as second cache in the embodiments of the present disclosure. The readable and writable cache 106 can be configured as multi-core cache MCC in FIG. 1. In an alternative embodiment, the readable and writable cache 106 also can be configured as other common cache.

The read-only cache 104 is also referred to as first cache, which is from storage space reserved for other services accessing data in the RAID manager 108. In an alternative embodiment, the read-only cache 104 is from reserved storage space for accessing the RAID manager 108 via a file system. The reserved storage space is used to store information for file system access, such as Unity storage device of EMC Corporation, on which the cache space reserved for file system access is provided. In a further alternative embodiment, the reserved cache also can be used for other services. If the service corresponding to the reserved storage space does not operate, the reserved cache space will be in idle.

In order to improve processing capability of the cache in the case of the storage capacity of the universal cache being limited, when the reserved cache has free storage space, the free storage space can be used as cache to process data by the processor, which can improve cache utilization rate and enhance data processing efficiency.

Because the reserved cache is for other services, the first cache is configured to be read-only with respect to the upper-layer applications, such that a corresponding storage space can be released in time when other services utilize this portion of storage space again and data loss will be avoided when the power supply is shut down.

In the present disclosure, the read-only cache 104 and the readable and writable cache 106 collectively act as the cache of the computing device 100 to process data, such that the available cache space is increased and the data processing efficiency is improved without changing the original cache storage space. The following contents will describe in details a procedure of performing data read/write processing using the read-only cache 104 in combination with the readable and writable cache 106.

Figure 2:
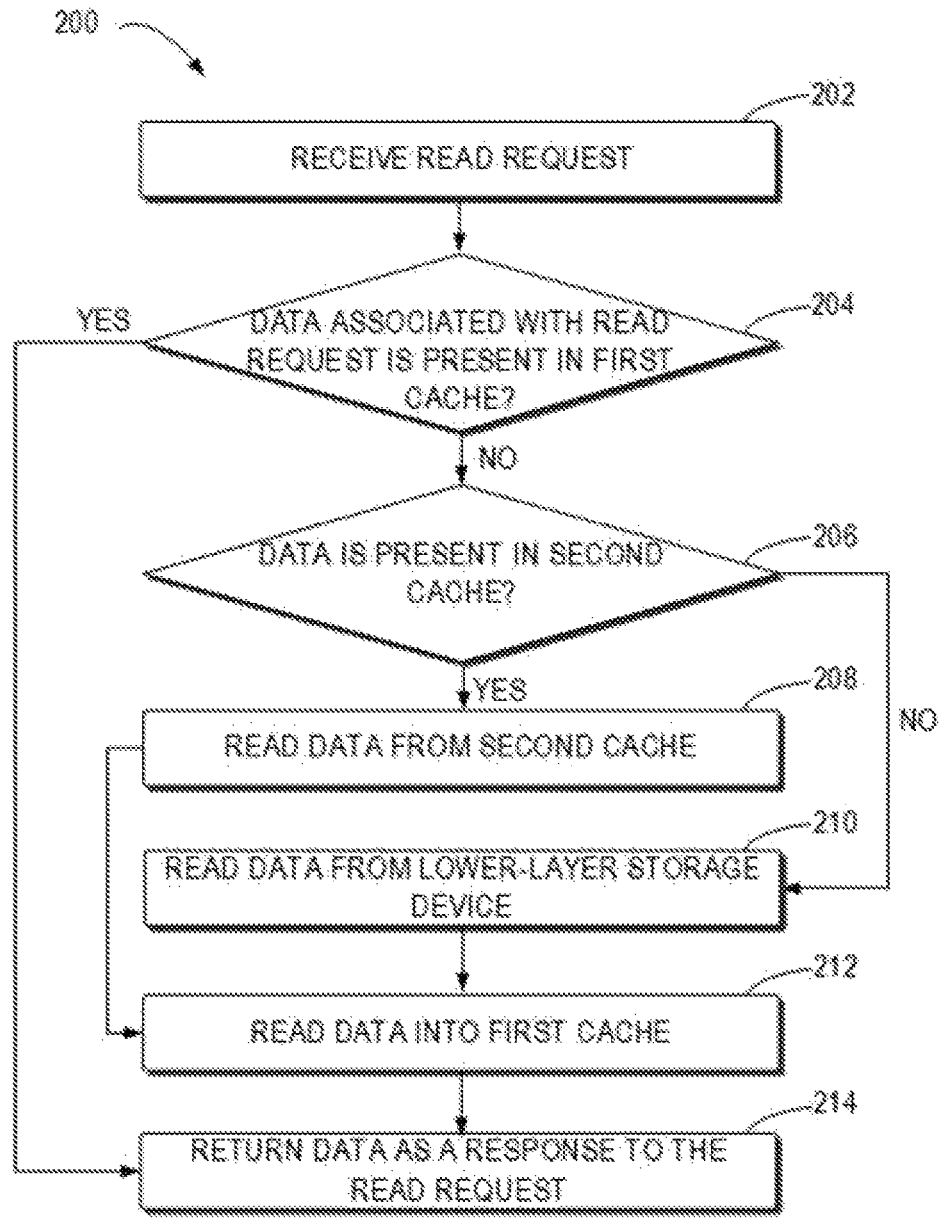
FIG. 2 illustrates a schematic diagram of a method 200 for processing a read request according to embodiments of the present disclosure.

FIG. 2 illustrates a schematic diagram of a method 200 for processing a read request according to embodiments of the present disclosure. A process of performing read operations using the read-only memory 104 and the readable and writable cache 106 will be described in details below with reference to FIG. 1A and the method 200 of FIG. 2.

When an application needs to read data from a data storage system 100, the controller 116 receives a read request at block 202. At this time, the controller will search in the cache 102 whether data associated with the read request is present. Because the cache 102 herein includes the read-only memory 104 and the readable and writable cache 106, the read operation is configured to first search the read-only memory 104.

At block 204, the controller determines whether the data associated with the read request is in the read-only cache 104. If the data associated with the read request is in the read-only cache 104, it indicates that the data is hit in the read-only cache. Therefore, the data is directly read from the read-only cache 104 and returned back to the application as a response to the read request, as shown by block 216.

When the data associated with the read request is not stored in the first cache, it indicates that the data to be read is missing in the first cache. As shown in FIG. 1A, the read operation enters the readable and writable cache 106. At this moment, it is required to determine whether the data to be read is in the readable and writable cache 106, i.e., whether the data is in the second cache, as shown by block 206. When the data is in the readable and writable cache 106, the data is read from the readable and writable cache 106 as shown by block 208, and then the read data is read into the read-only cache 104, i.e., read into the first cache, as shown by block 212. Meanwhile, it also returns the read data back to the upper-layer application as the response to the read request as shown by block 214.

It is known from the above contents that the data is also read into the read-only cache 104 while returning the data read from the readable and writable cache 106 back to the upper-layer application. The benefit of such operation is improving read hit rate of the data in the first cache at the next read operation. In the embodiments of the present disclosure, the sequence of blocks 212 and 214 shown in FIG. 2 is only for the purpose of examples and does not suggest the operations within the two blocks have a particular order. In an alternative embodiment, the operation in the block 214 can be first performed and then the operation in the block 212 is performed. In an alternative embodiment, the above two operations can be performed simultaneously.

If the data to be read is also not in the readable and writable cache 106, it indicates that the data to be read is not hit in the readable and writable cache 106. At block 210, it directly reads data from the RAID manager 108, i.e., reading data from a lower-layer mass storage device. Then, the read data is read into the read-only cache 104 as shown by block 212. Afterwards, it returns the data back to the upper-layer application as the response to the read request as shown by block 214.

In the above read procedure shown by FIG. 2, the cache capacity for data processing is increased by using the added read-only cache 104, which improves cache utilization rate. Meanwhile, when the data to be read is missing in the read-only cache during the read procedure, the read data is also read into the read-only cache while returning the data to the upper-layer application, so as to improve the hit rate of the read request for the read-only cache, as well as effectively improve the hit rate of the entire cache.

Figure 3:
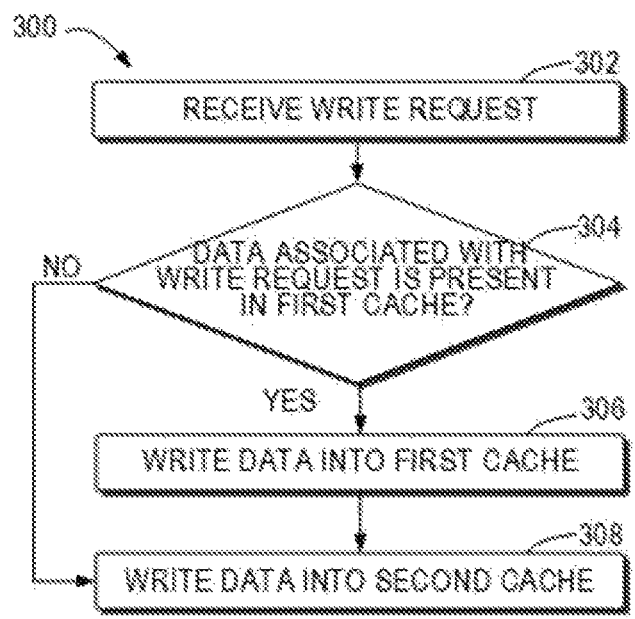
FIG. 3 schematically illustrates a flowchart of a method 300 for processing a write request according to embodiments of the present disclosure.

The preceding describes the read process for a new cache composed of the read-only cache 104 and the readable and writable cache 106 in FIG. 2. A write process for a new cache composed of the read-only cache 104 and the readable and writable cache 106 will be described in details with reference to FIG. 1B and FIG. 3. FIG. 3 illustrates a flowchart of a method 300 for processing a write request according to embodiments of the present disclosure.

At the block 302, when the controller 16 receives a write request, it will first search whether the data to be written is present in the cache. Because the new cache is composed of the read-only cache 104 and the readable and writable cache 106, i.e., including first cache and second cache, it is determined first whether the data associated with the write request is present in the read-only cache 104 when determining whether the data associated with the write request is hit in the cache, as shown by block 304.

In the present disclosure, the read-only cache 104 is only configured to be read-only for the upper-layer application, and it is writable inside the storage system. The data stored in the read-only cache 104 is clean data in the present disclosure. If the data in the second cache 106 or the RAID manager 108 is inconsistent with the data in the read-only cache 104, the data in the read-only cache 104 also needs to be changed respectively to guarantee clean data. As the write operations will result in changes of the data, it is required to determine whether the data associated with the write request is in the first cache.

When the data associated with the write request is in the read-only cache 104, at block 306, the data associated with the write request will be written into the first cache in order to ensure that the data in the read-only cache 104 is the same as the data in the readable and writable cache 106.

At block 308, the data is written into the readable and writable cache 106. In an alternative embodiment, the data will be written into the readable and writable cache 106 despite whether the data to be written is hit in the readable and writable cache 106.

Although FIG. 3 schematically illustrates the sequence of block 306 and block 308, it is only exemplary and is not intended to restrict the order. In an alternative embodiment, when the data associated with the write request is in the read-only cache 104, the data will first be written into the readable and writable cache and then be written into the read-only cache. In an alternative embodiment, the data can also be simultaneously written into the readable and writable cache 106 and the read-only cache 104.

When the data associated with the write request is not in the first cache, the data will be written into the second cache at block 308. In the above operation, a write operation completion command is returned back to the upper-layer application after writing the data into the second cache.

The above FIG. 3 describes a process of performing the write operation on a cache composed of the read-only cache 104 and the readable and writable cache 106. In an alternative embodiment, the dirty data stored in the readable and writable cache will be flushed into the lower-layer storage device, and the flush process can be implemented in various known manners.

Figure 4:
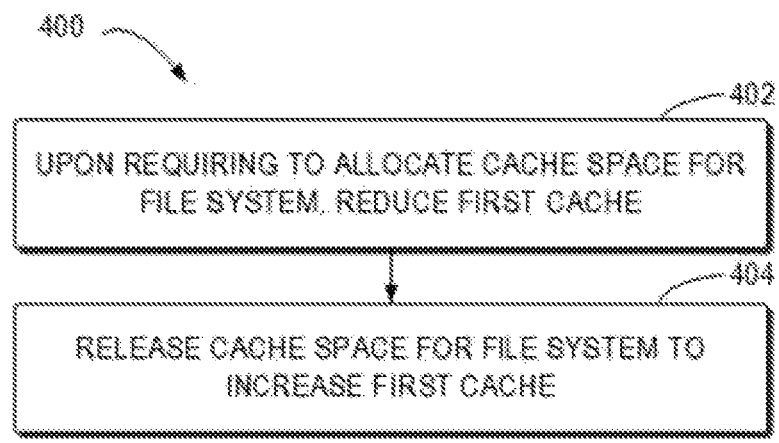
FIG. 4 schematically illustrates a flowchart of a method 400 for managing a first cache according to embodiments of the present disclosure.

The above FIG. 2 and FIG. 3 describe a procedure of read/write operation for a new cache composed of the read-only cache 104 and the readable and writable cache 106. However, because the read-only cache is fulfilled using free space of the reserved storage space for other services, the storage space of the read-only cache is varied. As shown in FIG. 4, such configuration allows maximum use of the free storage space while the storage space ensures smooth progress of other services, which improves the cache utilization rate.

At block 402, upon receiving a command that other services (such as file access) use the reserved cache, i.e., it is required to allocate cache space for other services, size of the read-only cache 104 will be reduced to release the storage space for implementing other services. In an alternative embodiment, the other services can be other services apart from file access service.

At block 404, upon receiving a command that other services (such as file access) do not use the reserved cache, i.e., releasing the storage space for other services, the space of the read-only cache will be increased. At this time, the data stored in the readable and writable cache 106 and the RAID manager can be read into the read-only cache 104 again.

Figure 5:
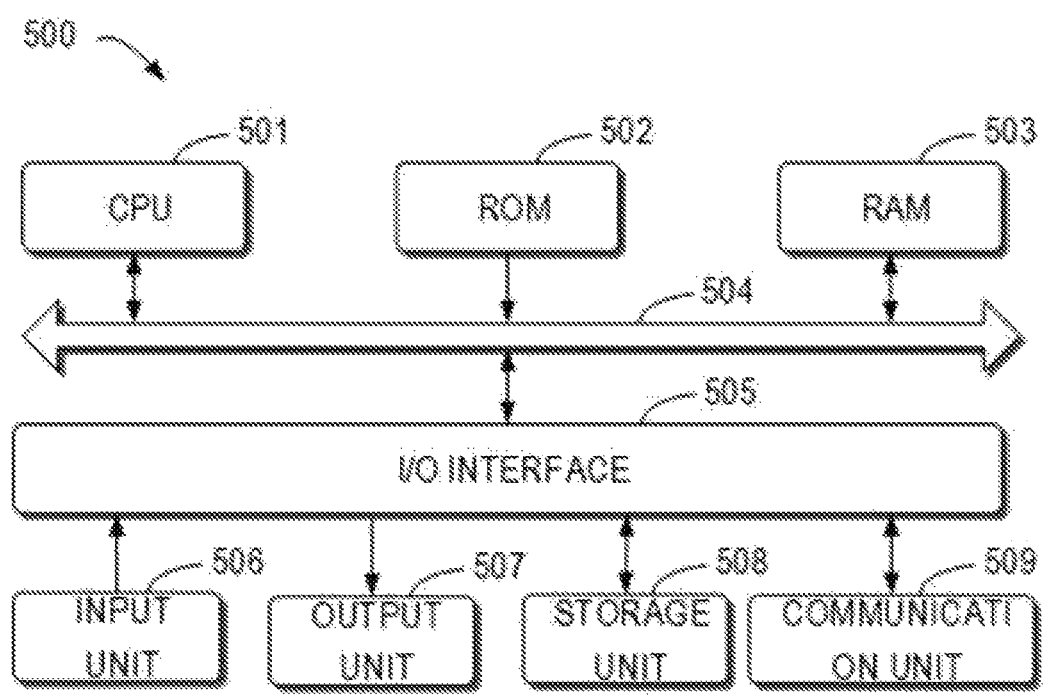
FIG. 5 illustrates a schematic block diagram of an example device 500 for implementing embodiments of the present disclosure.

FIG. 5 illustrates a schematic block diagram of an example device 500 for implementing embodiments of the present disclosure. For example, any of 108 and 116 shown in FIG. 1 can be implemented by the device 500. As shown, the device 500 includes a central process unit (CPU) 501, which can execute various suitable actions and processing based on the computer program instructions stored in the read-only memory (ROM) 502 or computer program instructions loaded in the random-access memory (RAM) 503 from a storage unit 508. The RAM 503 can also store all kinds of programs and data required by the operations of the device 500. CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as keyboard, mouse and the like; an output unit 507, e.g., various kinds of display and loudspeakers etc.; a storage unit 508, such as magnetic disk and optical disk etc.; and a communication unit 509, such as network card, modem, wireless transceiver and the like. The communication unit 509 allows the device 500 to exchange information/data with other devices via the computer network, such as Internet, and/or various telecommunication networks.

The above described each procedure and processing, such as method 200, 300 and 400, can also be executed by the processing unit 501. For example, in some embodiments, the method 200, 300 and 400 can be implemented as a computer software program tangibly included in the machine-readable medium, e.g., storage unit 508. In some embodiments, the computer program can be partially or fully loaded and/or mounted to the device 500 via ROM 502 and/or communication unit 509. When the computer program is loaded to RAM 503 and executed by the CPU 501, one or more steps of the above described method 200, 300 or 400 can be performed.

The present disclosure can be method, apparatus, system and/or computer program product. The computer program product can include a computer-readable storage medium having the computer-readable program instructions stored thereon for executing various aspects of the present disclosure.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via network, such as Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storing into the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable other ordinary skilled in the art to understand implementations of the present disclosure.

We claim:

1. A method of managing a cache, comprising:
in response to receiving a read request, determining whether data associated with the read request is present in a first cache, the first cache being a read-only cache;
in response to a miss of the data in the first cache, determining whether the data is present in a second cache, the second cache being a readable and writable cache;
in response to hitting the data in the second cache:
returning the data as a response to the read request; and
reading the data into the first cache;
in response to a miss of the data in the second cache:
reading the data from a lower-layer storage device associated with the managed cache as a response to the read request; and
storing the data into the first cache, the first cache being located in storage space within the lower-layer storage device reserved for one or more other data access services; and
in response to determining that the one or more other data access services require use of the reserved storage space in which the first cache is located, releasing at least a portion of the reserved storage space for implementing the one or more other data access services.

2. The method of claim 1, further comprising:
dynamically adjusting a size of the first cache based on usage of the reserved storage space by the one or more other data access services.

3. The method of claim 1, wherein the first cache is selected from the reserved storage space for a respective data access service from among the one or more data access services, the respective data access service corresponding to a file system.

4. The method of claim 1, wherein determining whether the data is present in the second cache is performed by a processor and further comprising managing, by a redundant array of independent disks (RAID) manager, a plurality of RAID groups of the lower-layer storage device, the plurality of RAID groups of the lower-layer storage device being located externally with respect to and separate from the processor.

5. A cache manager, the cache manager comprising:
a processor; and
a memory having computer program instructions stored thereon, the processor executing the computer program instructions in the memory to control the cache manager to perform acts comprising:
in response to receiving a read request, determining whether data associated with the read request is present in a first cache, the first cache being a read-only cache;
in response to a miss of the data in the first cache, determining whether the data is present in a second cache, the second cache being a readable and writable cache;
in response to hitting the data in the second cache:
returning the data as a response to the read request; and
reading the data into the first cache;
in response to a miss of the data in the second cache:
reading the data from a lower-layer storage device as a response to the read request; and
storing the data into the first cache, the first cache being located in storage space within the lower-layer storage device reserved for one or more other data access services; and
in response to determining that the one or more other data access services require use of the reserved storage space in which the first cache is located, releasing at least a portion of the reserved storage space for implementing the one or more other data access services.

6. The cache manager of claim 5, further comprising:
dynamically adjusting a size of the first cache based on usage of the reserved storage space by the one or more other data access services.

7. The cache manager of claim 5, wherein the first cache is selected from the reserved storage space for a respective data access service from among the one or more data access services, the respective data access service corresponding to a file system.

8. The cache manager of claim 5, wherein the first and second caches are located externally with respect to the processor.

9. A computer program product for managing a cache, comprising:
a non-transitory computer readable medium encoded with computer-executable code, the code configured for the execution of:

in response to receiving a read request, determining whether data associated with the read request is present in a first cache, the first cache being a read-only cache;

in response to a miss of the data in the first cache, determining whether the data is present in a second cache, the second cache being a readable and writable cache;

in response to hitting the data in the second cache:
  returning the data as a response to the read request; and
  reading the data into the first cache;

in response to a miss of the data in the second cache:
  reading the data from a lower-layer storage device associated with the managed cache as a response to the read request; and
  storing the data into the first cache, the first cache being located in storage space within the lower-layer storage device reserved for one or more other data access services; and in response to determining that the one or more other data access services require use of the reserved storage space in which the first cache is located, releasing at least a portion of the reserved storage space for implementing the one or more other data access services.

10. The computer program product of claim 9, wherein the code is further configured for the execution of:

dynamically adjusting a size of the first cache based on usage of the reserved storage space by the one or more other data access services.

11. The computer program product of claim 9, wherein the first cache is selected from the reserved storage space for a respective data access service from among the one or more data access services, the respective data access service corresponding to a file system.

* * * * *